United States Patent [19]
Iizuka

[11] Patent Number: 5,610,772
[45] Date of Patent: Mar. 11, 1997

[54] AUTOMOBILE SIDEVIEW MIRROR

[75] Inventor: Keiji Iizuka, Atsugi, Japan

[73] Assignee: Ichikoh Industries Ltd., Tokyo, Japan

[21] Appl. No.: 206,953

[22] Filed: Mar. 7, 1994

[30] Foreign Application Priority Data

Mar. 23, 1993 [JP] Japan .................................. 5-064036

[51] Int. Cl.⁶ .......................................................... B60R 1/06
[52] U.S. Cl. .......................... 359/841; 359/507; 359/509; 359/872; 359/876; 359/877
[58] Field of Search .................... 359/507, 513, 359/514, 871, 877, 872, 509, 511, 841, 843, 844, 873, 874, 876; D12/187, 188, 189; 180/903; 249/63

[56] References Cited

U.S. PATENT DOCUMENTS

| | | | |
|---|---|---|---|
| 4,449,796 | 3/1984 | Janssen et al. | 359/507 |
| 4,624,539 | 11/1986 | King et al. | 359/872 |
| 4,660,944 | 4/1987 | Suzuki et al. | 359/872 |
| 4,692,000 | 9/1987 | Wada et al. | 359/841 |
| 4,887,214 | 10/1989 | Toshiaki et al. | 359/877 |
| 4,906,086 | 3/1990 | Imai et al. | 359/507 |
| 5,177,642 | 1/1993 | Wakimoto | 359/844 |
| 5,179,470 | 1/1993 | Olson | 359/509 |
| 5,182,676 | 1/1993 | Iwai et al. | 359/841 |
| 5,313,336 | 5/1994 | Sakao et al. | 359/877 |
| 5,343,328 | 8/1994 | Chang | 359/507 |
| 5,432,641 | 7/1995 | Mochizuki | 359/841 |
| 5,467,222 | 11/1995 | Oishi | 359/841 |

FOREIGN PATENT DOCUMENTS

| | | | |
|---|---|---|---|
| 333220 | 9/1989 | European Pat. Off. | 359/871 |
| 0446095 | 9/1991 | European Pat. Off. | 359/873 |
| 3923947 | 1/1991 | Germany | 359/871 |
| 4039484 | 6/1992 | Germany | 359/871 |
| 0214032 | 9/1987 | Japan | 359/507 |
| 0041950 | 2/1990 | Japan | 359/871 |
| 0290753 | 11/1990 | Japan | 359/872 |
| WO85/00788 | 2/1985 | WIPO | 359/872 |

Primary Examiner—Paul M. Dzierzynski
Assistant Examiner—John Juba, Jr.
Attorney, Agent, or Firm—Foley & Lardner

[57] ABSTRACT

The mirror housing of the automobile sideview mirror is of an ordinary shell type and so formed at the lower edge of the front opening thereof as to have a generally V-shaped section of which the front arm of the letter "V" protrudes outwardly and is followed by a portion bent at the end of the front arm and extending almost horizontally and inwardly of the mirror housing.

4 Claims, 7 Drawing Sheets

AUTOMOBILE SIDEVIEW MIRROR

BACKGROUND OF THE INVENTION a) Field of the Invention

The present invention relates to an automobile sideview mirror, and more particularly, to a sideview mirror with a mirror housing having an aerodynamically improved form or configuration.

b) Prior Art Statement

Ordinary sideview mirrors of automobiles have a mirror housing designed in the form of a shell in order to minimize the air resistance to the mirror when the automobile is running. When a car having such a conventional shell-type sideview mirror runs at a speed as high as 150 km/h or more, an eddy flow of air is likely to take place near the front opening of the mirror housing, possibly causing a whizzing, the mirror to vibrate or a dust or dirt whiffed in an air flow from the road surface to enter and heap in the mirror housing through the front opening thereof. Any of the whizzing, mirror vibration and the dust heaping in the mirror housing, caused by such a turbulent flow will apparently be an inconvenience to the safety in a car driving at a speed higher than 150 km/h. Therefore, it is demanded at present to provide a sideview mirror having a mirror housing designed to meet the aerodynamic requirements in order to solve such problem.

Mirror housings having various esthetically improved outer configurations have so far been proposed to meet a variety of needs from the consumers. However, the above-mentioned aerodynamic requirements have not yet been met but still limit the designs of the outer configuration of the mirror housing, proposed to meet such consumers' needs.

SUMMARY OF THE INVENTION

Accordingly, the present invention has an object to overcome the above-mentioned drawbacks of the prior art by providing a sideview mirror having an improved mirror housing which meets the aerodynamic requirements and various needs in respect of the design.

The above object is accomplished by providing a sideview mirror adopting a mirror housing of an ordinary shell type, of which the lower portion near the lower edge of the front opening thereof is formed to have a generally V-shaped section of which the front arm of the letter "V" extends outwardly of the mirror housing and is followed by a portion extending almost horizontally and inwardly of the mirror housing, whereby an eddy flow causing the whizzing, mirror vibration, etc. is preventing from taking place in the proximity of the front opening of the mirror housing.

The above and other objects of the present invention will be apparent to those skilled in the art from reading of the following detailed description of the disclosure found in the accompanying drawings and novelty thereof pointed out in the appended claims.

DETAILED DESCRIPTION OF THE PREFERRED EMBODIMENT

Figure 1:
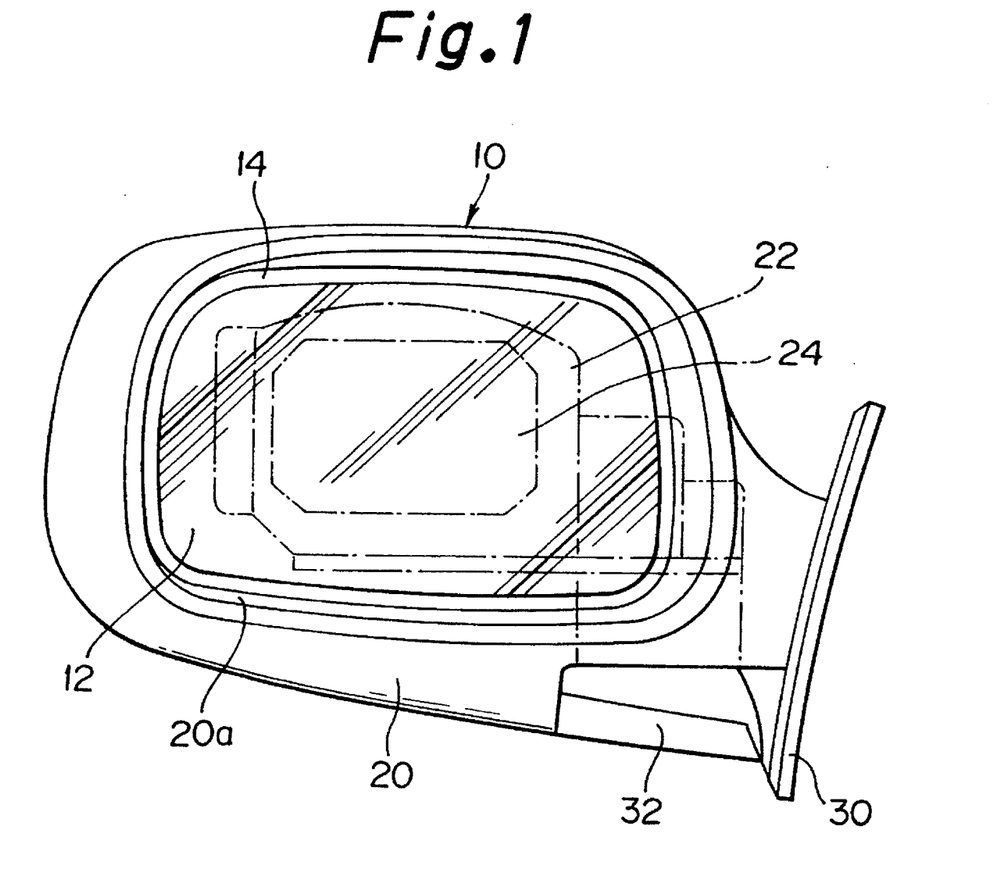
FIG. 1 is a schematic front view of one embodiment of the sideview mirror according to the present invention.
Figure 2:
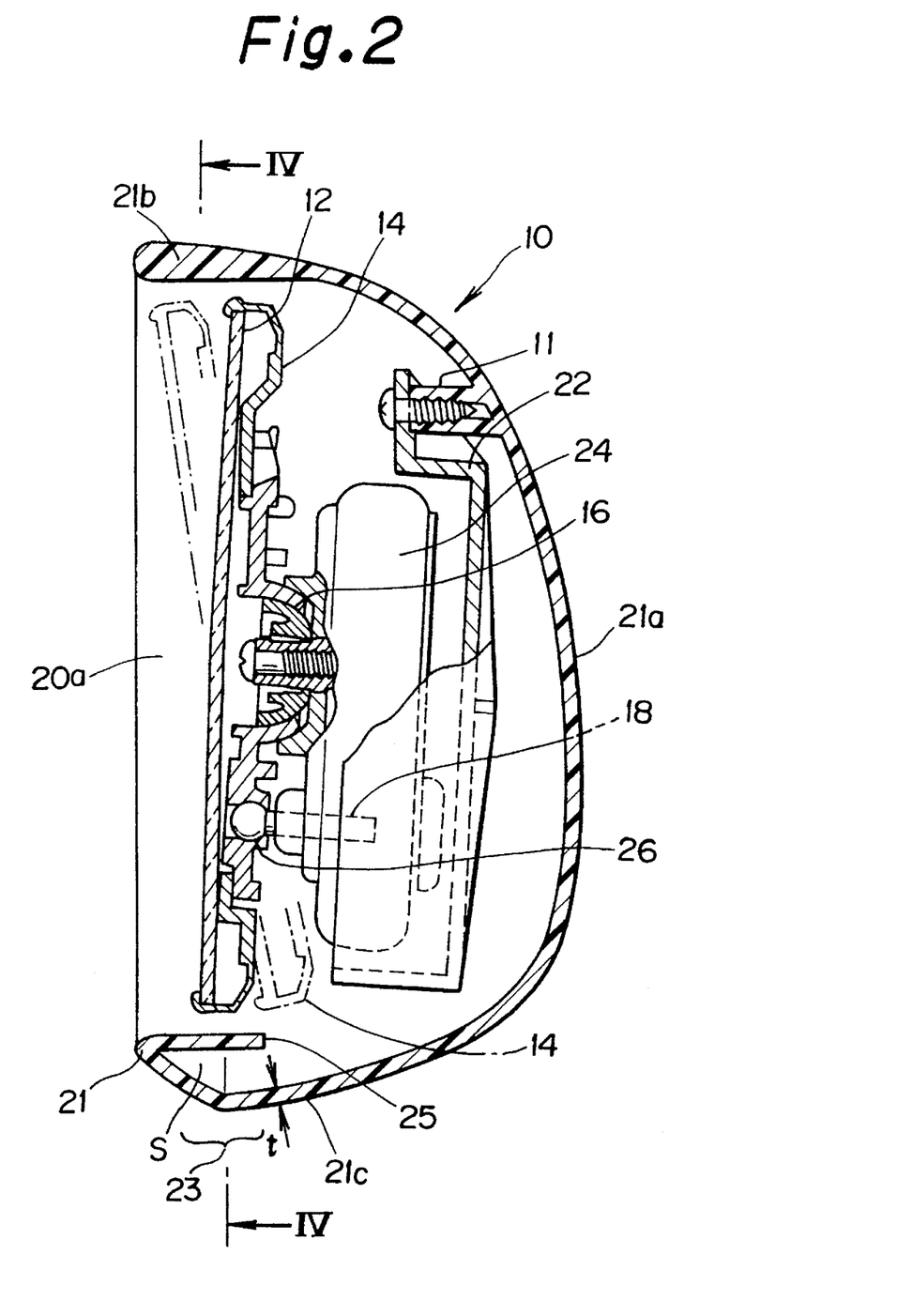
FIG. 2 is a sectional view, enlarged in scale, of the sideview mirror.
Figure 3:
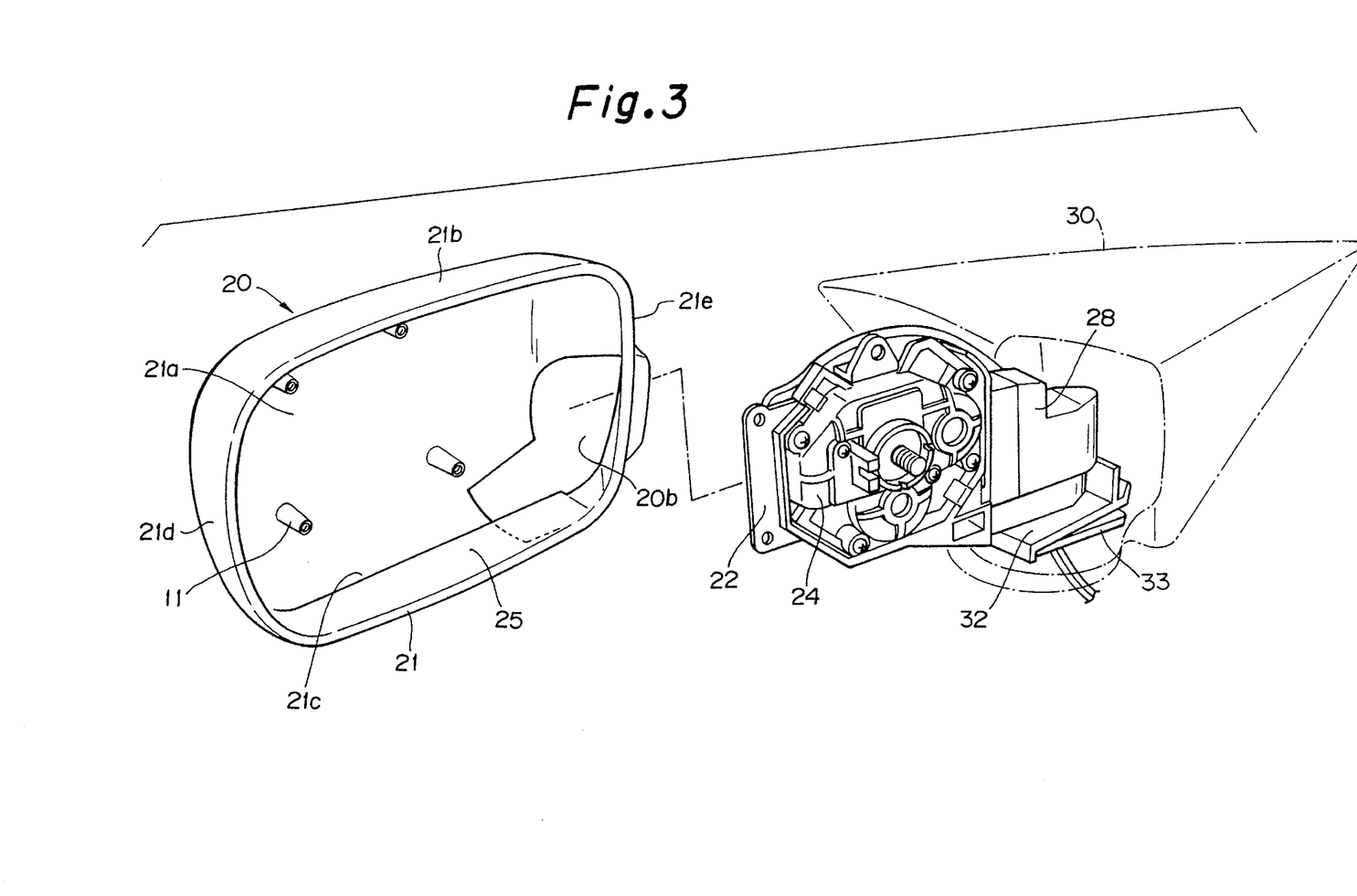
FIG. 3 is a schematic exploded perspective view to explain the installation of a bracket in the mirror housing, from which the mirror holder to which the mirror is fixed and the mirror drive unit are omitted.

Referring now to the drawings, one embodiment of the sideview mirror according to the present invention will be described in detail herebelow. A sideview mirror in this embodiment is indicated generally with a reference numeral 10 throughout the drawings. The sideview mirror 10 generally comprises a mirror 12, mirror holder 14 to which the mirror 12 is fixed, spherical support 16, a pair of plungers 18 and a shell-type mirror housing 20. The mirror housing 20 has a front opening 20a of which the shape generally corresponds to the outer configuration of the mirror 12. The sideview mirror 10 has also a mirror base 30 which is to be fixed to the body of a car. The mirror housing 20 is foldable with respect to this mirror base 30. As shown in FIGS. 2 and 3, a mirror drive unit 24 is also provided as fixed by means of a bracket 22 to and inside the mirror housing 20 and the mirror holder 14 is so supported on the mirror drive unit 24 as to be tiltable horizontally and vertically. On the other hand, the plungers 18 are driven by two motors (not shown), respectively, disposed inside the mirror drive unit 24. The plungers 18 are connected by means of a pair of ball-and-socket joints 26, respectively, to the mirror holder 14. As the plunger 18 is advanced or retreated (namely, the plunger is moved leftward or rightward in the plane of FIG. 2) by their respective motors, the mirror holder 14 is tilted clockwise or counterclockwise, respectively, in the plane of FIG. 2 about the spherical support 16.

In this embodiment, the bracket 22 is formed integrally with a mount 32 which is to have mounted thereon a drive mechanism 28 (consisting of a motor, reduction gear train and a drive gear) for folding the mirror housing 20 under remote control, and screwed to seats 11 formed, by molding, integrally with and inside the mirror housing 20. As shown in FIG. 3, the mount 32 is adapted for rotation in relation to a shaft holder 33 fixed to the mirror base 30. More specifically, the mount 32 is rotatably supported by a shaft (not shown) extending almost vertically from the shaft holder 33. The drive gear (not shown) in the drive mechanism 28 is in mesh with a gear (not shown) fixed to the shaft. As the drive gear is driven by the motor, the mirror housing 20 will be pivoted, that is to say, folded, with respect to the mirror base 30.

The mirror housing 20 has also formed therein a lateral opening 20b corresponding in shape to the shape of the mirror base 30 and which will be described later. The lateral opening 20b is designed in shape to just fit the shape of the mirror base 30 when the mirror housing 20 is folded toward the mirror base 30.

Figure 4:
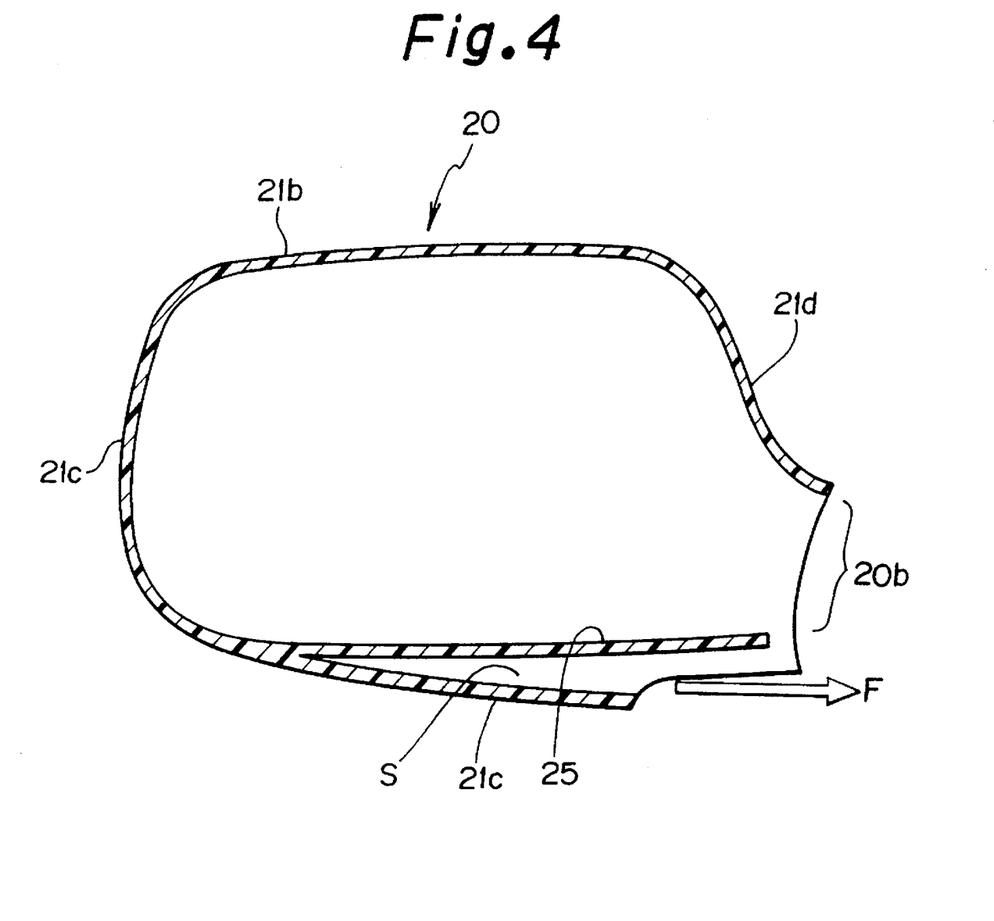
FIG. 4 is a sectional view, reduced in scale, of the mirror housing, taken along the line IV—IV in FIG. 2.
Figure 5:
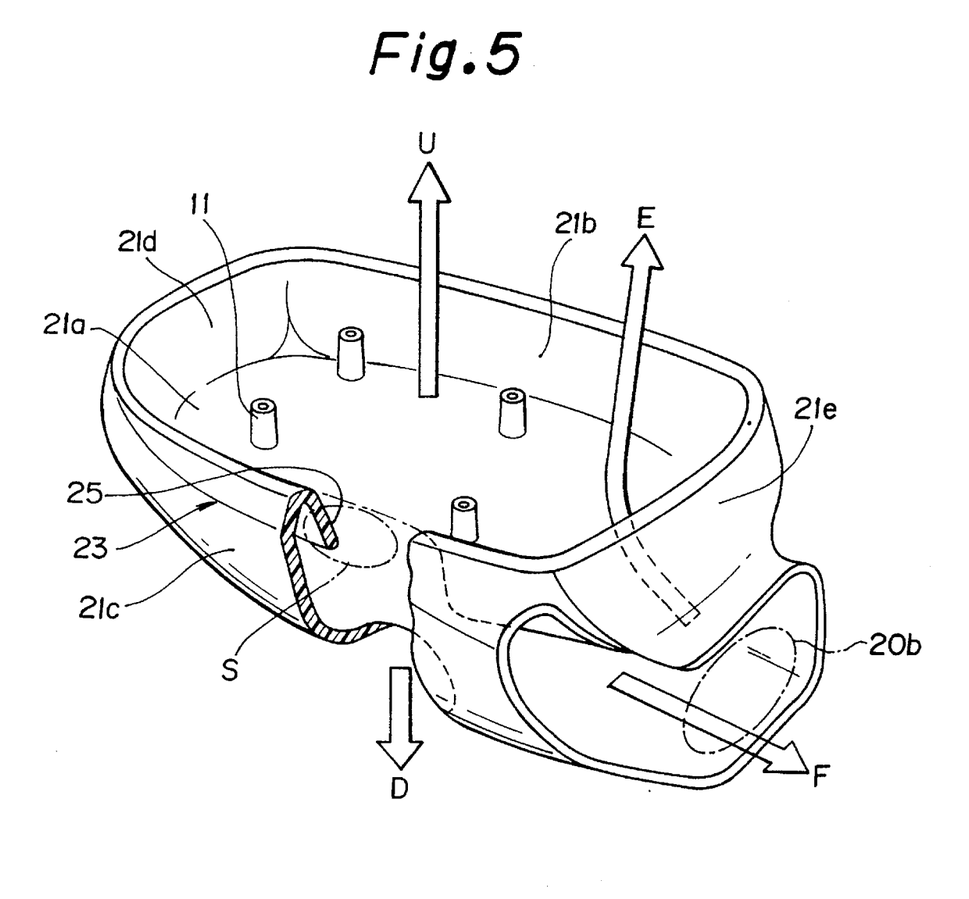
FIG. 5 is a schematic perspective view including a partial cutaway of the essential part of the mirror housing according to the present invention.

The mirror housing 20 adopted in the sideview mirror according to the present invention will be discussed in detail herebelow. As shown in FIGS. 3 to 5, the mirror housing 20 comprises a generally rectangular rear wall 21a, top and bottom walls 21b and 21c rising from two sides, respectively, opposite to each other, of the rear wall 21a, left and right side walls 21d and 21e rising from other two opposite sides, respectively, of the rear wall 21a and coupling the top and bottom walls 21b and 21c to each other. In the mirror housing 20, the front opening 20a is defined by the edges of the top wall 21b, bottom wall 21c, left side wall 21d and right side wall 21e and has the reflecting surface of the mirror 12 disposed therein, while the lateral opening 20b is formed in a part of the right side wall 21e at a location where the wall 21e joins the rear wall 21a and bottom wall 21c. The mirror housing 20 is basically of the ordinary shell structure. The direction from the upper edge of the front opening 20a, that is to say, the edge of the top wall 21b, toward the lower edge of the front opening 20a, namely, the edge of the bottom wall 21c, nearly corresponds to the axis of the sideview mirror 10, while the direction from the leftside edge of the front opening 20a, say, the edge of the left side wall 21d, toward the right side wall of the front opening 20a, namely, the edge of the edge of the right side wall 21e, nearly corresponds to the horizontal axis.

The shell-type mirror housing 20 of the sideview mirror 10 according to the present invention is characterized in that it includes, near a lower edge 21 of the front opening 20a thereof, a portion 23 formed to have a generally V-shaped section along the lower edge 21, the front arm of the letter "V" extending outwardly of the mirror housing 20 and followed by a portion 25 extending almost horizontally and inwardly of the mirror housing 20 from the lower edge 21. Because of such an outer configuration of the mirror housing 20, an eddy flow formed by air moving from the rear wall 21a of the mirror housing 20 along the bottom wall 21c when the car with the sideview mirror runs at a high speed takes place at a position far away from the front opening 20a in which the mirror 12 is provided, that is to say, a position shifted in a direction opposite to the running direction of the car. In the conventional shell-type mirror housing, the eddy flow would occur rather near the front opening thereof. Therefore, the mirror according to the present invention will be considerably less affected directly by the eddy flow. Also thanks to such outer configuration, the drive unit, bracket, etc. provided behind the reflecting surface of the mirror will not be visible from the driver of the car. Thus, the sideview mirror according to the present invention has an esthetically good appearance.

The horizontally extending portion 25 is formed integrally with other parts such as the V-sectional portion 23, etc. by injection molding of a synthetic resin. Namely, it has a same thickness t as that of the other parts. The V-sectional portion 23 and horizontally extending section 25 define together between them a space S open on the side of the lateral opening 20b as shown in FIGS. 4 and 5, which is desirable for formation of the V-sectional portion 23 and horizontally extending portion 25 contiguous to the portion 23 in an ordinary shell-type housing. More particularly, for molding of a housing having a space S of such a shape between the horizontally extending section 25 and V-sectional portion 23, it is necessary to prepare a special core 34 which has a shape corresponding to the space S, which will be described later.

The lateral opening 20b of the mirror housing 20 is intended for introducing the drive mechanism 28 through it for installation inside the mirror housing 20. If this opening 20b is designed large, a mold can be easily prepared for the mirror housing 20. However, if the opening 20b is designed small, it is difficult to prepare a mold for the mirror housing 20. In case the opening 20b is large, a whizzing will take place, so it is desirable that the opening 20b should be as small as possible in such a range that the drive mechanism 28 can be introduced through the opening 20b for installation within the mirror housing 20.

The process of injection-molding of the mirror housing 20 from a synthetic resin according to the present invention will be discussed briefly below. To mold the mirror housing 20 shown in FIG. 5, a main core (not shown) for forming a part of the rear wall 21a of the mirror housing 20, the top wall 21b, left side wall 21d and a part of the bottom wall 21c, a sub core (not shown) for forming the right side wall 21e including a part of the lateral opening 20b and the rest of the rear wall 21a, a special core 34 for forming the rest of the bottom wall 21c including the horizontally extending section 25 and V-sectional portion 23 and the rest of the lateral opening 20b, and a cavity (not shown) are prepared and appropriately arranged.

Figure 6:
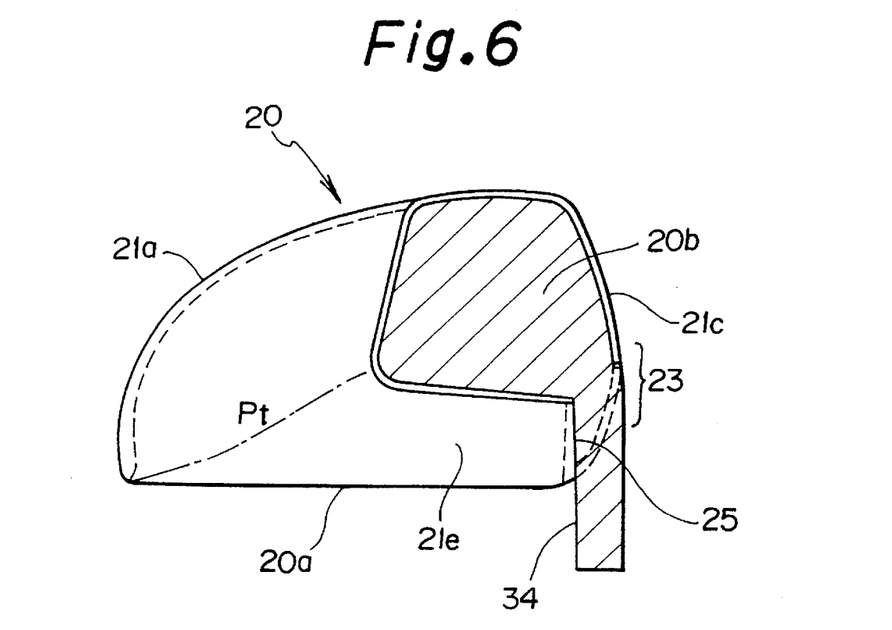
FIGS. 6 and 7 show, in a cutaway, the shape and position of a special core for molding the mirror housing according to the present invention, FIG. 6 being a schematic view from the lateral opening and FIG. 6 being a schematic view from the bottom.
Figure 7:
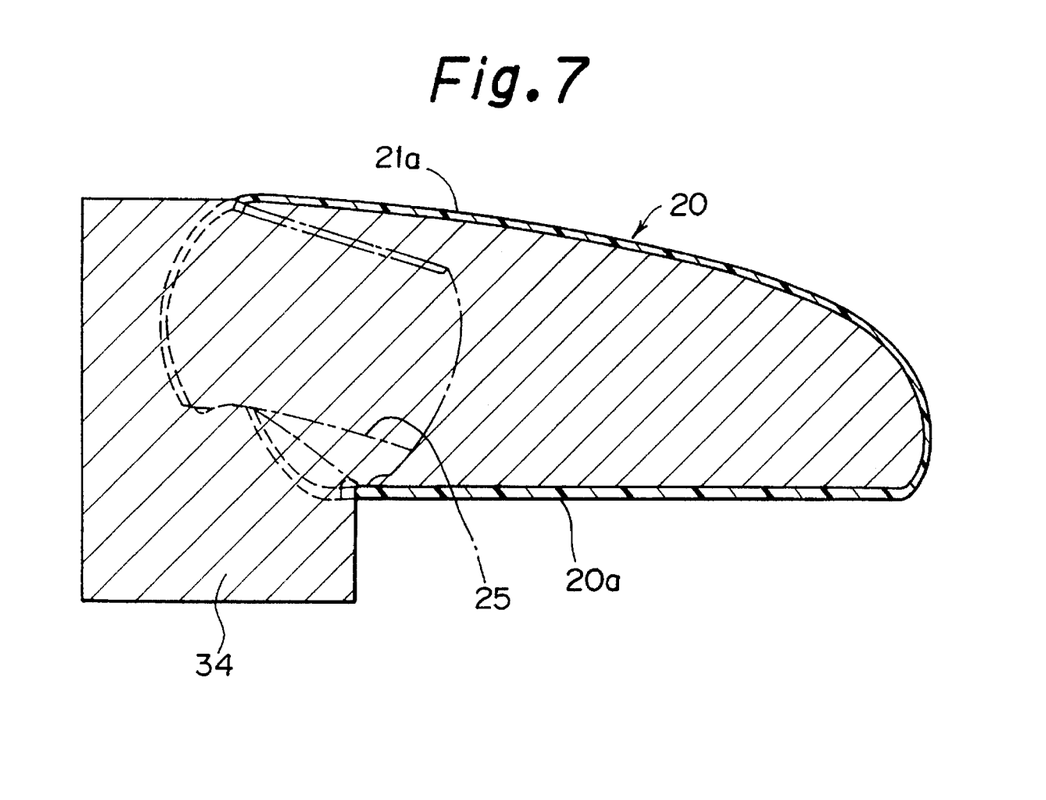

FIGS. 6 and 7 show the special core 34 as hatched for better understanding of the shape and position thereof.

After completion of the injection molding, the special core 34 is first slid and drawn out in the direction of arrow F toward the lateral opening 20. Thereafter, the cavity is opened in the direction of arrow D and the sub core is drawn out in the direction of arrow E. Furthermore, the main core is drawn out in the direction of arrow U toward the front opening 20a. Thus, the mirror housing 20 is formed as a whole.

Figure 8:
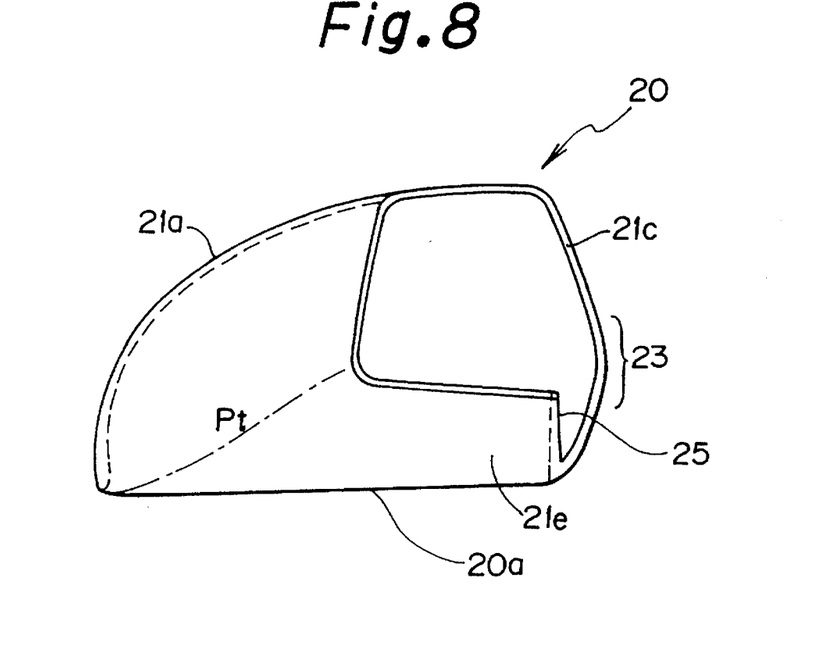
FIG. 8 is an appearance of the mirror housing, viewed from the lateral opening, the mirror housing being laid with the front opening down.
Figure 9:
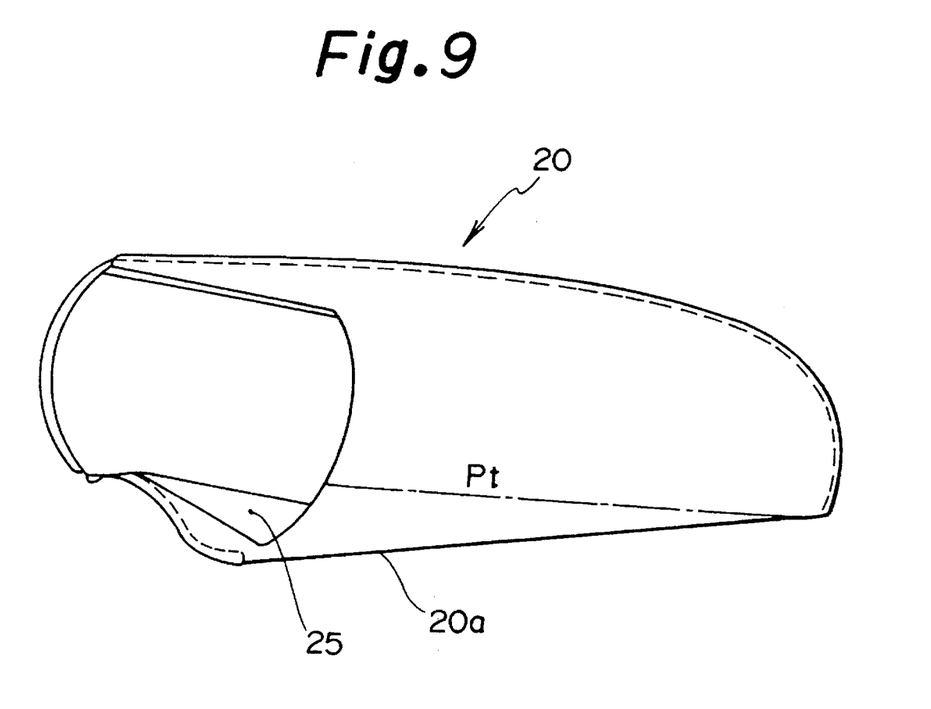
FIG. 9 is a schematic view, from the bottom, of the mirror housing.

FIGS. 8 and 9 show the appearance of the mirror housing 20 thus molded. In these Figures, it is shown with the front opening 20a directed downward and the front edge of the mirror housing 20 laid horizontally. In Figures, the dot-dash line Pt indicates the parting line which will appear after the mold opening. The bottom of the V-sectional portion 23 nearly corresponds to the parting line Pt.

In the embodiment of the sideview mirror according to the present invention having been described in the foregoing, the mirror housing is driven by a motor to fold with respect to the mirror base. However, the present invention is not limited to a sideview mirror of such a type but is applicable to a sideview mirror of a manually foldable type and other ordinary sideview mirrors.

As having been discussed above, when a car with the sideview mirror according to the present invention runs at a high speed of 150 km/h or more, an eddy flow of air causing the whizzing, mirror vibration, etc. will take place at a position away from the front opening of the mirror housing and thus will have only a considerably reduced adverse affect on the sideview mirror. Also, dust or dirt whirled from the road surface will not enter as carried by the air flow into the mirror housing through the front opening.

What is claimed is:

1. A sideview mirror assembly for motor vehicles, comprising:

a mirror holder for supporting a mirror, said mirror having an outer configuration;

a drive unit for tiltably supporting said mirror holder, said drive unit being adapted for operatively coupling at least two plungers to said mirror holder;

a mirror housing for retaining said drive unit and said mirror holder, said mirror housing having a rear wall and side walls, a lower edge, a front opening, and a lateral opening, the shape of said front opening substantially corresponding to the outer configuration of said mirror, and at least a portion of said lower edge forming a V-shape such that said lower edge has an inwardly extending portion and an outwardly extending portion, said lower edge further including a horizontally extending portion adjacent to said outwardly extending portion, said inwardly, outwardly, and horizontally extending portions being integrally formed with said mirror housing, and said inwardly, outwardly, and horizontally extending portions defining a region therebetween that is open in the direction of both the rear wall of the mirror housing and to the lateral opening of said mirror housing; and a mechanism for folding said mirror housing;

wherein the lateral opening of said mirror housing is adapted to receive said folding mechanism for installation thereof within the mirror housing.

2. A sideview mirror assembly for motor vehicles according to claim 1, wherein each of said inwardly and outwardly extending portions are of the same thickness.

3. A sideview mirror assembly according to claim 1, wherein said mirror housing is formed by injection molding and said V-shaped portion thereof is formed by employing one or more specifically adapted inserts which correspond with the shape of said region between said inwardly and outwardly extending portions of said housing.

4. A sideview mirror assembly for motor vehicles, comprising:

a mirror holder for supporting a mirror, said mirror having an outer configuration;

a support for tiltably supporting the mirror holder;

a mirror housing for retaining said support and said mirror holder, said mirror housing having a rear wall and side walls, a lower edge, a front opening, and a lateral opening, the shape of said front opening substantially corresponding to the outer configuration of said mirror, and at least a portion of said lower edge forming a V-shape such that said lower edge has an inwardly extending portion and an outwardly extending portion, said lower edge further including a horizontally extending portion adjacent to said outwardly extending portion, said inwardly, outwardly, and horizontally extending portions being integrally formed with said mirror housing, and said inwardly, outwardly, and horizontally extending portions defining a region therebetween that is open in the direction of both the rear wall of the mirror housing and to the lateral opening of said mirror housing;

a mechanism for folding said mirror housing;

wherein the lateral opening of said mirror housing is adapted to receive said folding mechanism for installation thereof within the mirror housing.

* * * * *